US011176156B2

(12) United States Patent
Jagota et al.

(10) Patent No.: US 11,176,156 B2
(45) Date of Patent: Nov. 16, 2021

(54) EFFICIENTLY AND ACCURATELY ASSESSING THE NUMBER OF IDENTIFIABLE RECORDS FOR CREATING PERSONAL PROFILES

(71) Applicant: salesforce.com, inc., San Francisco, CA (US)

(72) Inventors: Arun Kumar Jagota, Sunnyvale, CA (US); Stanislav Georgiev, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 263 days.

(21) Appl. No.: 16/409,559

(22) Filed: May 10, 2019

(65) Prior Publication Data

US 2020/0356574 A1 Nov. 12, 2020

(51) Int. Cl.
*G06F 16/25* (2019.01)
*G06N 7/00* (2006.01)
*G06F 16/23* (2019.01)

(52) U.S. Cl.
CPC ........ *G06F 16/254* (2019.01); *G06F 16/2365* (2019.01); *G06N 7/005* (2013.01)

(58) Field of Classification Search
CPC .. G06F 16/254; G06F 16/2365; G06F 16/215; G06N 7/005
See application file for complete search history.

(56) References Cited

U.S. PATENT DOCUMENTS

| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

*Primary Examiner* — Etienne P Leroux
(74) *Attorney, Agent, or Firm* — Dergosits & Noah LLP; Todd A. Noah

(57) ABSTRACT

A system determines a name probability based on a first name dataset frequency of a first name value stored by a first name field in a personal record and a last name dataset frequency of a last name value stored by a last name field in a personal record. The system determines at least one other probability based on another dataset frequency of another value stored by another field in the personal record and an additional dataset frequency of an additional value stored by an additional field in the personal record. The system determines a combined probability based on the name probability and the at least one other probability. The system increments a count of identifiable personal records for each personal record that has a corresponding combined probability that satisfies an identifiability threshold. The system outputs a message based on the count of identifiable personal records.

20 Claims, 5 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobsen et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0038516 A1* | 2/2007 | Apple .................... G06Q 30/02 705/14.42 |
| 2008/0301074 A1* | 12/2008 | Dozier ................ G06F 16/9558 706/21 |
| 2009/0063415 A1 | 3/2009 | Chatfield et al. |
| 2009/0100342 A1 | 4/2009 | Jakobsen |
| 2009/0177744 A1 | 7/2009 | Marlow et al. |
| 2012/0233137 A1 | 9/2012 | Jakobsen et al. |
| 2013/0218948 A1 | 8/2013 | Jakobsen |
| 2013/0218949 A1 | 8/2013 | Jakobsen |
| 2013/0218966 A1 | 8/2013 | Jakobsen |
| 2014/0359537 A1 | 12/2014 | Jakobsen et al. |
| 2015/0007050 A1 | 1/2015 | Jakobsen et al. |
| 2015/0095162 A1 | 4/2015 | Jakobson et al. |
| 2015/0172563 A1 | 6/2015 | Jakobson et al. |
| 2017/0018170 A1* | 1/2017 | Sayavong ............. G08B 13/00 |
| 2017/0357903 A1* | 12/2017 | Pal ........................ G06N 5/04 |

* cited by examiner

EFFICIENTLY AND ACCURATELY ASSESSING THE NUMBER OF IDENTIFIABLE RECORDS FOR CREATING PERSONAL PROFILES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Companies are often overwhelmed with personal data. Examples of personal record fields include a name, a billing address, a shipping address, an email address, and a phone number. Managing personal data may become extremely complex and dynamic due to the many changes that individuals go through over time. For example, a company's purchasing agent can change her family name upon marriage, change her email address, change her phone number, and change her employer within a relatively short period of time. In another example, a customer who is known by the name Robert can also use Rob, Robby, Bob, and Bobby as his given name. The use of personal data may create additional challenges, such as due to invalid email addresses, invalid phone numbers, invalid street addresses, names spelled wrong, incorrect employer information, and duplicate personal records with inconsistent information. When these personal record fields are multiplied by the millions of personal records which a company may have in its data sources, and the frequency of how often this personal data is incorrect or changes is also taken into consideration, the result is that many companies have a significant data management challenge.

Furthermore, the potential for personal data challenges may increase when personal data enters a company's customer data system from the company's multiple data sources. Examples of a company's data sources include the personal data from interactions conducted by the company's marketing, retail, and customer service departments. This personal data may be distributed for storage by different cloud storage providers, and/or these company departments may be organized as different tenants in a multi-tenant database.

A traditional approach to resolving these challenges is through the instantiation of a database system that functions as a master data management hub which stages, profiles, cleanses, enriches, matches, reconciles, and instantiates all personal records to create a single master profile for each person, and then provides access to these master profiles and their cross references to business applications. The database system can use the generated master profiles to assist in responding to customer requests. For example, a customer makes a purchase via a company's retail cloud instance, and the customer enters some identifying information when filing a service request with the company's customer service cloud instance. The database system can respond by automatically finding all that is known about this customer in their master profile, especially in the purchase record(s) of the relevant item, so as to enable the company's customer service department to process the service request more effectively.

Since personal data processing is complex, errors may occur. For example, during a matching process a database system may miss a match between a record that stores the name Jonathan Smith and another record that stores the misspelled name Jontahon Smith. In another example, during a matching process a database system may erroneously identify a match between a record that stores the name Erica Jones and another record that stores the lexically similar name Eric Jones. In yet another example, during a clustering process a database system may group records of different people, such as John Smith and Jonathan Smith, into a set of records for one person. Matching, clustering, and merging problems may be exacerbated when a database system processes international data.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1A:
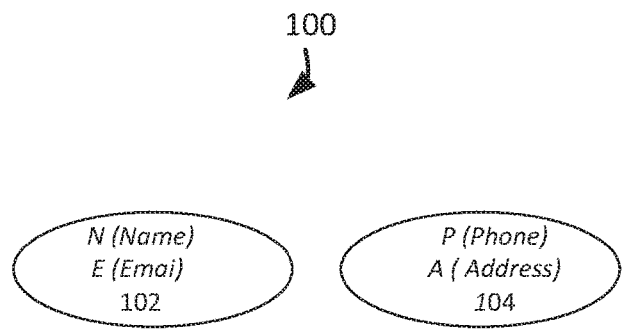
FIGS. 1A-B illustrate example Bayesian network models used for efficiently and accurately assessing the number of identifiable records for creating personal profiles, in an embodiment.

In accordance with embodiments described herein, there are provided methods and systems for efficiently and accurately assessing the number of identifiable records for creating personal profiles. A system determines a name probability based on a first name dataset frequency of a first name value stored by a first name field in a personal record and a last name dataset frequency of a last name value stored by a last name field in the personal record. The system determines at least one other probability based on another dataset frequency of another value stored by another field in the personal record and an additional dataset frequency of an additional value stored by an additional field in the personal record. The system determines a combined probability based on the name probability and the at least one other probability. The system increments a count of identifiable personal records for each personal record that has a corresponding combined probability that satisfies an identifiability threshold. The system outputs a message based on the number of identifiable personal records.

For example, a probability model assesses the uniqueness of a personal record that stores John Smith in its name fields through multiplying the probability that the personal record's first name field stores John by the probability that the personal record's last name field stores Smith given that the personal record's first name field stores John. thereby producing the name probability for John Smith. Since the personal record stores John Smith in its name fields, the probability model assesses the uniqueness of the personal record that also stores jsmith@xyz.com in its email address fields through multiplying the probability that the personal record's email domain field stores xyz.com by the probability that the email prefix pattern is flast given that the personal record's email domain field stores xyz.com, thereby producing the email address probability for jsmith@xyz.com. The probability model multiplies the name probability for John Smith by the email address probability forjsmith@xyz.com to produce the combined probability of less than 1 in a million for the personal record that stores John Smith, jsmith@xyz.com. The probability model counts each personal record that has a combined probability of less than one in a million, including the personal record that stores John Smith, jsmith@xyz.com, as an identifiable personal record. The probability model outputs a message that the 500,000 identifiable personal records are likely to create 250,000 accurate personal profiles, which is a sufficient number of accurate personal profiles for managing the personal records.

Systems and methods are provided for efficiently and accurately assessing the number of identifiable records for creating personal profiles. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. The following detailed description will first describe network models for efficiently and accurately assessing the number of identifiable records for creating personal profiles. Next, methods and systems for efficiently and accurately assessing the number of identifiable records for creating personal profiles will be described with reference to example embodiments.

While one or more implementations and techniques are described with reference to an embodiment in which efficiently and accurately assessing the number of identifiable records for creating personal profiles is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

A personal record may be referred to as an identifiable personal record if the data in the personal record's fields is likely to uniquely determine one person, but if the data in the personal record's fields is likely to apply to more than one person, then the personal record may not be referred to as an identifiable personal record. For example, if the only fields in a personal record that store data are the name fields which store the name John Smith, this personal record is not an identifiable personal record because there are many people named John Smith. In another example, if the only field in a personal record that stores data is the city field which stores a city name, this personal record is not an identifiable personal record because the city name alone does not identify only one person. In yet another example, if the only fields in a personal record that store data are the phone number fields which store a phone number, this personal record is not an identifiable personal record because a phone number may appear in the records of many different people if the phone number is the main phone number for a company.

The fraction of an organization's personal records that are identifiable personal records may be used to estimate the number of accurate of personal profiles built using the organization's personal records. If most of an organization's personal records are identifiable personal records, a sufficient number of accurate personal profiles may be built from the identifiable personal records for personal management. However, if relatively few of an organization's personal records are identifiable personal records, a sufficient number of accurate personal profiles for personal management is unlikely to be built from the relatively few identifiable personal records.

Each of an organization's personal records may be assessed as to whether or not the personal record is an identifiable personal record without requiring any of the personal records to be matched against each other. Such an assessment has the benefit of avoiding the complex operations of matching personal records and clustering personal records, which are time-consuming and intricate processes, thereby creating system efficiency by reducing the consumption of system resources. Additionally, the assessment of personal records as identifiable is more accurate than such an assessment obtained from the matching and clustering processes because the assessment of personal records as identifiable is based on the intrinsic identifiability of each personal record, and not based on which personal records currently match potentially millions of other personal records.

A probability model can estimate the probability of a record based on the values stored in the personal record fields. R denotes a personal record, and N denotes a personal name, P denotes a phone number, E denotes an email address, and A denotes a physical address. for the personal record fields. The personal name N is a composite of F, which denotes first name, and L, which denotes last name. The phone number P is a composite of RC, which denotes region code, MD, which denotes middle digits, and TD, which denotes trailing digits. The email address E is a composite of EP, which denotes email prefix, and ED, which denotes email domain. The physical address A is a composite of S, which denotes street address, C, which denotes city, Z, which denotes postal code, St, which denotes state, and Ct which denotes country. Any of these personal record fields may be missing data.

The probability model estimates the probability P(R) of any personal record R, even if the probability model has never assessed a personal record with any of R's values, and even if any fields in R may be missing data. Then the probability model can generate a uniqueness score for R from P(R) and make a judgement of whether or not R is identifiable from this uniqueness score, such as by comparing this uniqueness score against an identifiability threshold.

A Bayes network model can include nodes that model data stored in personal record fields and can capture dependencies among the personal record fields. FIG. 1A depicts the highest level 100 of the Bayes network model, in which NE 102 models the combination (name, email) which is preserved to model the dependency between a person's name and their email address, while PA 104 models the combination (phone, address), which is preserved to model the dependency between a person's phone number and their physical address, or geographical attributes. NE 102 and PA 104 are assumed to be independent of each other, which is a reasonable assumption and keeps the Bayes network model from becoming intractable.

Figure 1B:
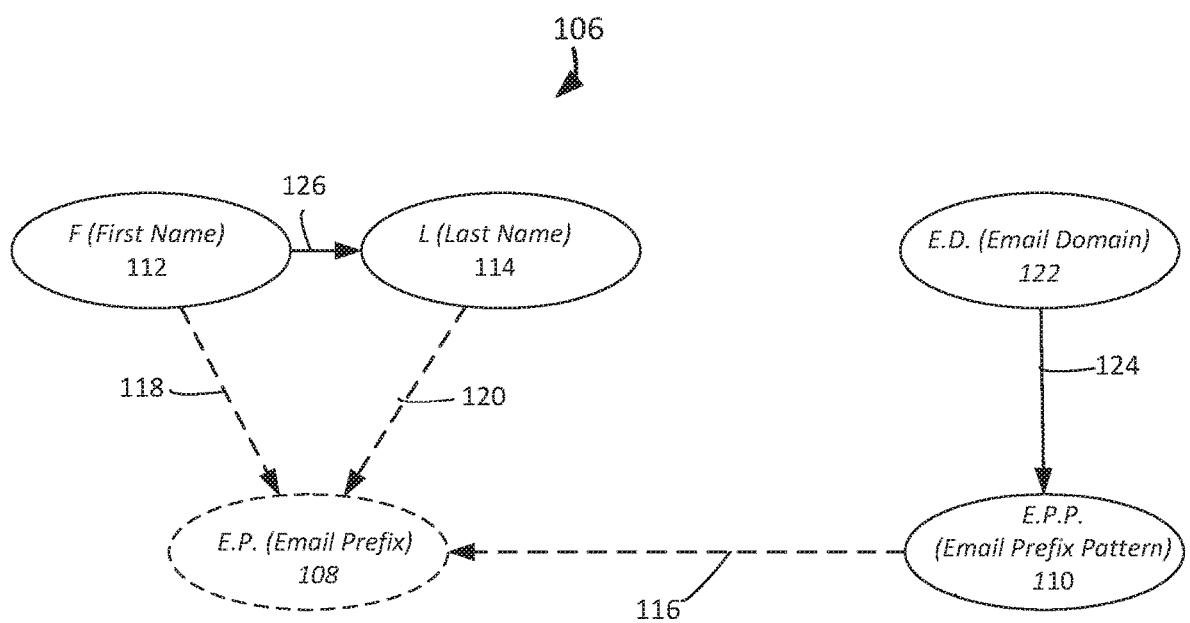

FIG. 1B depicts a lower level 106 of the Bayes network model's highest level 100. EP 108 models the email prefix in an email address, such as jsmith is the email prefix in the email address jsmith@xyz.com, while EPP 110 models the email prefix pattern that the email prefix employs. The pattern of the email prefix jsmith applied to F=John and L=Smith is flast, which is the first letter of F 112. which models first name, appended to L 114, which models last name. FIG. 1B depicts the arc 116 from EPP 110 to EP 108, the arc 118 from F 112 to EP 108, and the arc 120 from L 114 to EP 108 to indicate that the value of the EP 108 is uniquely determined by the values of EPP 110, F 112, and L 114. As an example, if F=John, L=Smith, and EPP flast, then EP must be jsmith. ED 122 models the email domain, and the arc 124 from ED 122 to EPP 110 captures the influence of the email domain on the distribution of email prefix patterns, as many organizations use one email prefix pattern more frequently than other email prefix patterns. The arc 126 from F 112 to L 114 models the dependency among the first names and last names, but the arc 126 could have been depicted in the opposite direction. The lack of an arc from ED 122 to either F 112 or L 114 indicates that email domain is assumed to be independent of a person's first name and last name. The email prefix patterns modeled by EPP 110 may be depicted by the following examples that use F=John and L=Smith.

| Email Prefix Pattern (EPP) | Email Prefix (EP) |
| --- | --- |
| flast | jsmith |
| first.last | john.smith |
| first-last | john-smith |
| first_last | john_smith |
| lastf | smithj |
| last.first | smith.john |
| last-first | smith-john |
| last_first | smith_john |

The model P(EPP|ED) may be learned from suitable data, such as a dataset of (F, L, E) tuples, with all three values storing data. ED 122 and EP 108 are extracted from E, and EPP 110 is obtained from EP 108, F 112, and L 114 to generate the expanded tuples (F, L, E, ED, EP, EPP), from which (ED, EPP) is needed for training. The probability model P(F, L) is trained isolated from the NE 102 portion of the network. The training set is assumed to be a random, unbiased sample from the population of unique persons, such as the entire world. Therefore, the relative frequency of any particular (F, L) combination in the training set is an unbiased estimator of its relative frequency in the population. This assumption is approximately met so long as the training sample is roughly random, even if the training sample includes some duplicated data. Such a training set for the personal names portion may be assembled from publicly available data combined with data from people databases such as the data.com database, because a person's name is public information. Although helpful if available, personal name models do not need an organization's data for training.

The personal names model is able to estimate the probability of any first name and last name combination, whether or not these names occur in the training set. This ability to provide an estimate based on data that is not in the training set is known as generalization in machine learning. To maximize the generalization ability, first name and last name are assumed to be independent because a model that incorporates interactions among first names and last names requires a much larger training set than a model that assumes these first names and last names are independent. Such an independence assumption is used because a full name generally tends to decompose into an independent first name and last name. For example, the first name John may be paired with any last name, such as Smith, Cruise, or Kent. However, dependencies exist among first names and last names, such as the high correlation between the ethnicities of first names and last names. For example, Asian last names are frequently, but not always, paired with Asian first names.

While maintaining generalization, the P(F, L) model is a joint model that provides accuracy by taking interactions between F and L into account. To compensate for not having enough data for comprehensive training, the P(F, L) model is trained on the data set of (first name, last name) pairs that are available for training. Then the marginals P(F) and P(L) are obtained from this trained P(F, L) model. Next, sufficiently-many (F, L) pairs are sampled from the product P(F)*P(L) of the two marginals, under the assumption of independence between first names and last names, and this sample is added to the training set. Finally, the joint P(F, L) model is retrained on the new training set.

The original training set instances help the P(F, L) model capture interactions between first names and last names. The new training set instances, sampled under the independence assumption, effectively randomly combine first names and last names with frequencies based on their marginals. This alleviates the concern that the original training set is not large enough to accurately train a joint model. For example, if the full name Kevin Chao is not present in the original training set, the P(F, L) model should not conclude that no person with this name exists in the population. The P(F, L) model could avoid this inference by assigning a pseudo count of one to any name that does not appear in the training set. Alternatively, the P(F, L) model can take into account the individual commonness of the first name and the individual commonness of the last name.

Figure 2A:
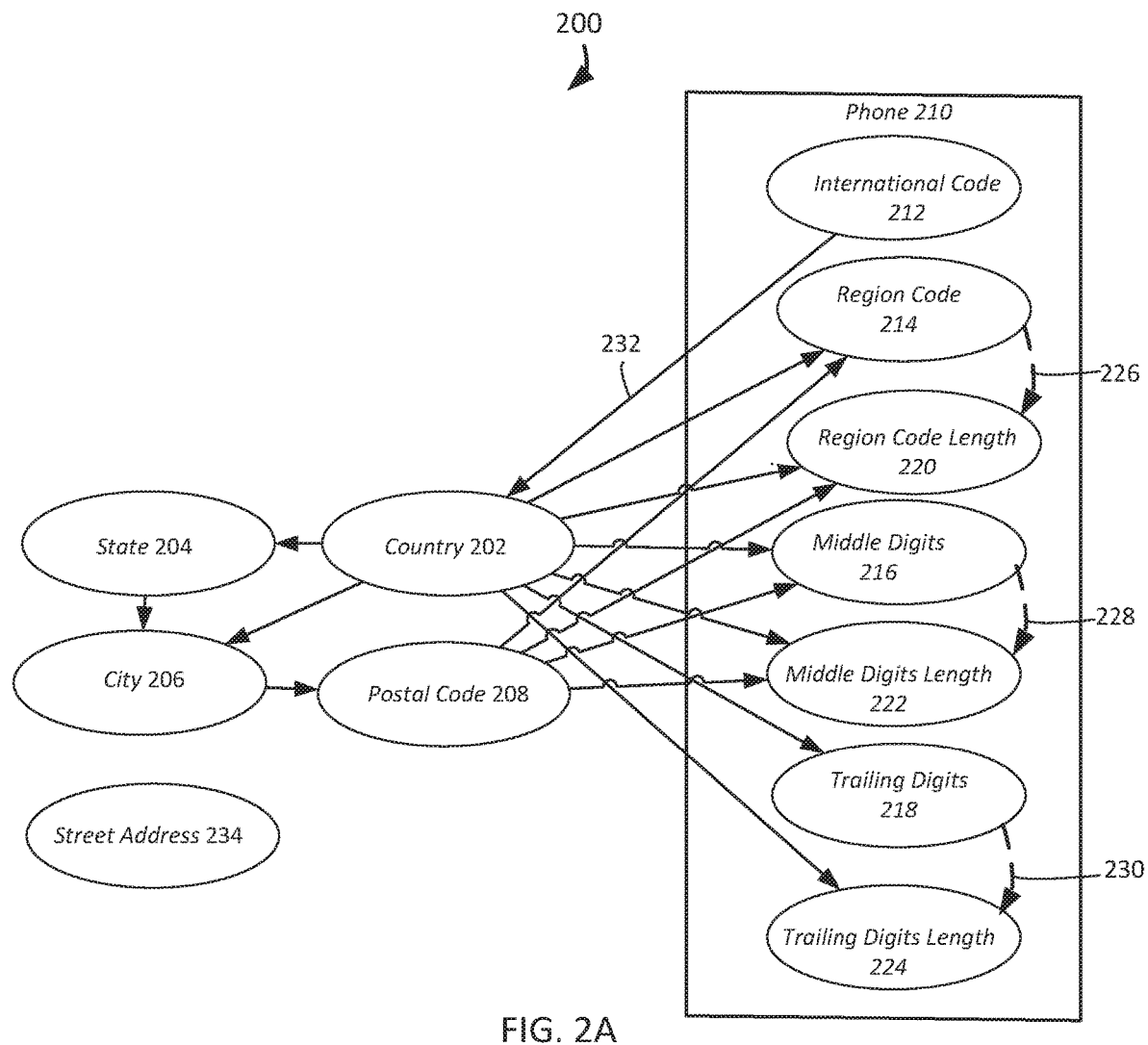
FIGS. 2A-B illustrate additional example Bayesian network models used for efficiently and accurately assessing the number of identifiable records for creating personal profiles, in an embodiment.

FIG. 2A depicts another lower level 200 of the Bayes network model's highest level 100. For the physical address 104 portion of the network, country 202 influences state 204, the combination of country 202 and state 204 influence city 206, and city 206 influences postal code 208. At a conceptual level, a phone number 210 is divided into four phone number components, the international code 212, the region code 214, the middle digits 216, and the trailing digits 218. For example, in the U.S.A., area code would be the region code 214, NXX would be the middle digits 216, and the remaining four digits would be the trailing digits 218.

As an additional subtlety, for each of the phone number components' region code 214, middle digits 216, and trailing digits 218, the phone number component's length is added as a derived attribute for a smoothing operation. The phone number component length enables compensation for any sampling biases in the training data set. For example, the training set may not have enough instances for certain countries to enable estimates of P(region code|country) that are accurate for every region code in that country, and some region codes may even be missing from the training data set. However, the attribute region code length 220 does not have this problem because region codes in any particular country will span only a small number of different lengths, and there is plenty of data to learn the distribution of these lengths. The same reasoning applies to the middle digits length 222 and trailing digits length 224.

Each of the arc 226 from the region code 214 to the region code length 220, the arc 228 from the middle digits 216 to the middle digits length 222, and the arc 230 from trailing digits 218 to the trailing digits length 224 is dashed to depict that the tail of the arc is uniquely determined from the head of the arc. The values in each of the six phone number components 214-224 (excluding the international code 212) are influenced by the country 202. In the probability model, the country 202 may already store data or be inferred from the international code 212. The arc 232 between the international code 212 and the country 202 points in the direction of the country 202 because when the international code 212 is known and the country 202 is unknown, the country 202 may be inferred from the international code 212, and then the various phone number components 214-224 may be inferred from the country 202. Postal code 208 influences the region code 214, the middle digits 216, the region code length 220, and the middle digits length 222, which allows capturing more granular influences.

A training set of the form (country, international code) is needed to train the conditional distribution P(country|international code) on the arc 232, and such a training set is easily obtained from publicly available data. Additional training set instances may be created from personal records in which both the phone 210, including the international code 212, and the country 202 store non-null data. The influence of the country 202 on the phone 210 may be captured by the training of the distributions of the various phone number components, such as training each of P(region code) country), P(region code length|country), P(middle digits|country), P(middle digits length|country), P(trailing digits|country), P(trailing digits length|country), For this purpose, the availability of a suitable training set of (country, phone) pairs is assumed. Such a training set could be projected out from a training set of personal records. If the country 202 is missing in a personal record, but the phone 210 has the international code 212, the country 202 may be inferred from the international code 212.

These phone number components 212-224 may be parsed out of each (country, phone) instance in the training set, resulting in expanded instances of the form (country, phone, international code, region code, region code length, middle digits, middle digits length, trailing digits, trailing digits length). Once these phone number components 212-224 have been parsed, the training of the conditional distributions is straightforward. Similarly, possibly via a suitable projection from a training set of personal records, a training set for the distributions may be obtained for the influence of postal code on phone number components 214, 216, 220, and 222, specifically tuples of the form (postal code, region code, region code length, middle digits, middle digits length). From such a training set, the training of the conditional distributions is straightforward.

Figure 2B:
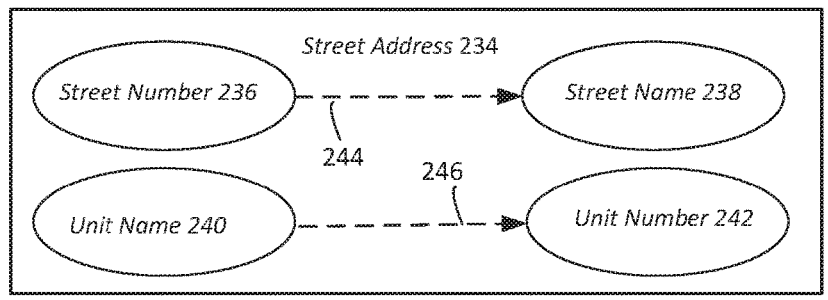

Dependencies between the street address 234 and other geographical components may not be considered to prevent the Bayes network model from becoming even more complex than it is. The street address parser that parses out various street address 234 components can explicitly or implicitly take into account the country 202 in which the street address 234 components are located. Most countries 202 will have street addresses 234 comprised of street number 236, street name 238 and might also have unit name 240 (such as apt, suite, or floor), and unit number 242 (such as the apartment, suite, or floor number). as depicted by FIG. 2B. The dashed arc 244 from the street number 236 to the street name 238 reflects that a street number 236 tends to be present only if a street name 238 is also present, and the dashed arc 246 from the unit name 240 to the unit number 242 reflects that a unit name 240 tends to be present only if a unit number 242 is also present. Other than these constraints, the four nodes 236-242 are independent. Although the values of street name 238 depend on the language used in a country 202, these dependencies are omitted to avoid complicating the model further.

Any field in a personal record R=(F, L, P, E, S, Z, C, St, Ct) might be empty. The probability P(R) is computed using the Bayes network model. N is the number of records in the population, such as the set of people on earth, and N*P(R) is the expected number of distinct people having the same attributes as the (non-missing) attributes in R. For example, if the first name=John and the last name=Smith are the only values stored in a personal record R, then N*P(R) is the expected number of distinct John Smith's in the population.

The structure of the Bayes network model is used to compute the probability of a personal record R. Probabilities of suitable subsets of the values stored in R are computed. The probability of R is then obtained by multiplying out these probabilities. For example, the personal name probability may be computed as:

$$P(F,L)=P(F)*P(L|F) \qquad \text{Equation (1)}$$

The estimated P(John, Smith) should be significantly higher than 0. Consequently, the expected number of distinct John Smith's in a population of people, such as 1 million people, should be significantly greater than 1. This estimated probability quantifies that the personal name John Smith is not unique, such that a personal record that stores only John Smith is not an identifiable record. In another example, the estimated P(John, Suzecky) should be quite small, even though John is a common first name, because Suzecky is an uncommon last name, maybe more so in the context of the first name John.

For an example of estimating the probability of a phone number, either the country is known, or there is an international code in the phone number from which the country may be uniquely determined.

$$P(P)=P(\text{rest of phone}|Ctry) \quad \text{Equation (2)}$$

where $$P(\text{rest of phone}|Ctry)=\max\{P(RC|Ct),P(RCL|Ct)/|RCL|\}*\max\{P(MD|Ct),P(MDL|Ct)/|MDL|\}*\max\{P(TD|Ct),P(TDL|Ct)/|TDL|\} \quad \text{Equation (3)}$$

In Equation (3) RC, RCL, MD, MDL, TD, TDL denote phone number P's region code, region code length, middle digits, middle digits length, trailing digits, and trailing digits length, respectively. The max terms in Equation (3) may be understood by understanding any one of the max terms in Equation (3), such as max{P(RC|Ct), P(RCL|Ct)/|RCL|. This max term expresses two ways to estimate the probability of the specific region code RC for the particular country Ct, either directly via P(RC|Ct), or indirectly by taking the region code length probability P(RCL|Ct), and dividing it by the number of possible region codes of length RCL, which are denoted as |RCL|. If there is sufficient data to accurately estimate the direct probability P(RC|Ct), this direct estimate will yield a higher probability than the indirect estimate. However, when the particular region code RC is not paired with the particular country Ct in the training set, then the direct estimate will be 0. The indirect estimate will be a bit higher than 0 if the particular region code RC has a suitable length and 0 if the particular region code RC has a length that is inferred as not possible from the training set for the particular country.

The probability of the street address may be estimated as:

$$P(S)=P(\text{street\_num})*P(\text{streetname}|\text{streetnum})*P(\text{unitname})*P(\text{unitnum}|\text{unitname}) \quad \text{Equation (4)}$$

The probability of the physical address may be estimated as:

$$P(A)=P(S,C,Z,St,Ct)=P(Ct)*P(St|Ct)*P(C|St,Ct)*P(Z|C)*P(S) \quad \text{Equation (5)}$$

The probability of the phone number components might not be simply multiplied by the physical address probability because some phone number components may interact with some physical address components.

$$P(P,A)=P(A)*P(\text{rest of phone}|A) \quad \text{Equation (6)}$$

where $$P(\text{rest of phone}|A)=\max\{P(RC|Z),P(RCL|Z)/|RCL|\}*\max\{P(MD|Z),P(MDL|Z)/|MDL|\}*\max\{P(TD|Ct),P(TDL|Ct)/|TDL|\} \quad \text{Equation (7)}$$

The postal code Z influences the probabilities involving the region code and the middle digits.

The joint probability of the name and the email address may be estimated as:

$$P(F,L,E)=P(F,L,EP,ED)=P(F,L)*P(ED)*P(EPP|ED) \quad \text{Equation (8)}$$

where EPP is uniquely derived from the combination of F, L, and EP.

For example, if F=John, L=Smith, and E=jsmith@xyz.com, then P(John, Smith) is multiplied by the factor P(xyz.com)*P(flastl|xyz.com). Even if P(flastl|xyz.com) equals 1, multiplying P(John, Smith) by the factor P(xyz.com)*P(flastl|xyz.com) will drop the probability of this record R significantly. The expected number of John Smith's in the population is effectively multiplied by the fraction of people having an email address at the domain xyz.com, based on the assumption that most people only have a few email addresses, especially if the people are business contacts and their email addresses are all business addresses.

If the personal record R stores only a name and a phone number, then P(R) is calculated by multiplying the personal name probability by the phone probability. If the personal record R stores only a name and a physical address, then P(R) is calculated by multiplying the personal name probability by the physical address probabilities. If the personal record R stores only a name, an email address, and a phone number, then P(R) is calculated by multiplying the joint probability for the personal name and the email address by the phone number probability. If the personal record R stores a name, an email address, a phone number, and a physical address, then P(R) is calculated by multiplying the joint probability for the personal name and the email address by the joint probability for the phone number and the physical address. For example, if F=John, L=Smith. then the probability of the name alone, P(F, L) is too high. However, multiplying P(F, L) by P(E) will reduce the combined probability, and then multiplying by the joint probability of the phone number and the physical address will further reduce the combined probability to be sufficiently rare so as to be deemed identifiable.

Figure 3:
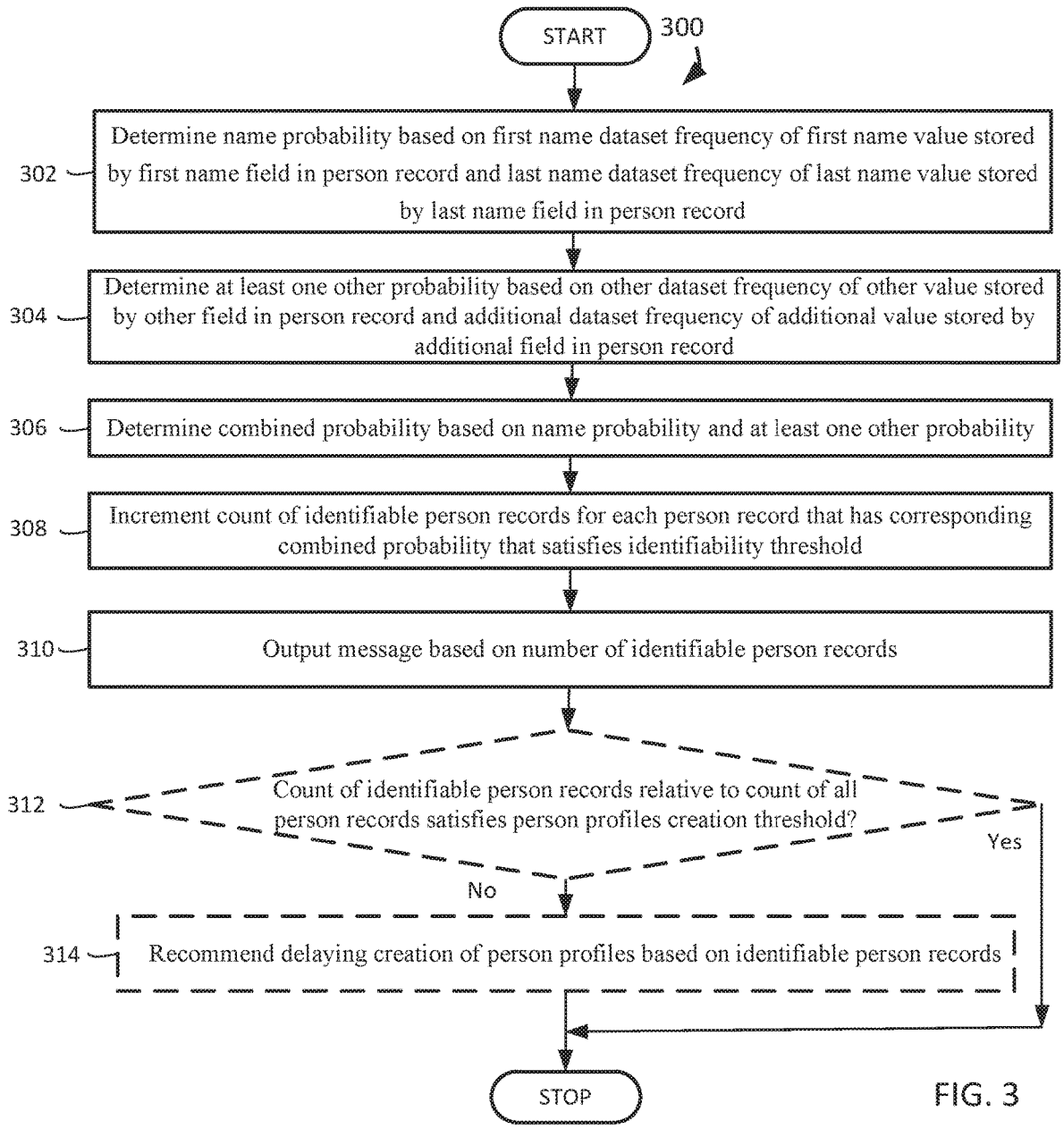
FIG. 3 is an operational flow diagram illustrating a high-level overview of a method for efficiently and accurately assessing the number of identifiable records for creating personal profiles, in an embodiment.

FIG. 3 is an operational flow diagram illustrating a high-level overview of a method 300 for efficiently and accurately assessing the number of identifiable records for creating personal profiles. A name probability is determined based on a first name dataset frequency of a first name value stored by a first name field in a personal record and a last name dataset frequency of a last name value stored by a last name field in the personal record, block 302. The system estimates the probability that a personal record stores its name values. For example, and without limitation, this can include a probability model assessing the uniqueness of a personal record that stores John Smith in its name fields through multiplying the probability that the personal record's first name field stores John by the probability that the personal record's last name field stores Smith given that the personal record's first name field stores John, thereby producing the name probability for John Smith.

A name probability can be the likelihood a personal label being the case. A first name dataset frequency can be the rate at which a given personal label occurs in a sample of a group of information. A dataset frequency is illustrated in the example above, in which the first name dataset frequency of the personal record's first name field John is be the rate at which the first name John occurs in a training set of first names. A first name value can be any symbols) for a given personal label. A first name field can be a part of a record that represents data for a given personal label.

A personal record can be the storage in a persistent form of at least one value for a human. A last name dataset frequency can be the rate at which an inherited personal label occurs in a sample of a group of information. A last name value can be any symbols for an inherited personal label. A last name field can be a part of a record that represents data for an inherited personal label.

Although this example describes the first name dataset frequency and the last name dataset frequency as dependent frequencies, the first name dataset frequency and the last name dataset frequency may be independent frequencies or a combination of independent frequencies and dependent frequencies. For example, the probability model assesses the uniqueness of the personal record that stores John Smith in its name fields through multiplying the probability that the personal record's first name field stores John by the probability that the personal record's last name field stores Smith to produce the name probability for John Smith. A dependent frequency can be the rate at which something occurs in a sample that is contingent on another rate at which another thing occurs in another sample. An independent frequency can be the rate at which something occurs in a sample, which is unaffected by another rate at which another thing occurs in another sample. A combination can be a joining of different parts.

In addition to determining the name probability, at least one other probability is determined based on another dataset frequency of another value stored by another field in the personal record and an additional dataset frequency of an additional value stored by an additional field in the personal record, block 304. The system estimates the probability that a personal record stores its values, such as email address values, physical address values, and phone number values. By way of example and without limitation, this can include the probability model determining that the personal record stores John Smith in its name fields, and assessing the uniqueness of the personal record that also stores jsmith@xyz.com in its email address fields through multiplying the probability that the personal record's email domain field stores xyz.com by the probability that the email prefix pattern is flast given that the personal record's email domain field stores xyz.com, thereby producing the email address probability for/smith@ xyz.com.

A probability can be the likelihood of something being the case. A dataset frequency can be the rate at which something occurs in a sample of a group of information. A value can be any symbol{s} for something. A field can be a part of a record that represents data for something.

The at least one other probability may include an email address probability, a physical address probability, and/or a phone number probability. The email address probability can be the likelihood of a unique identifier for an account used to send and receive messages over the Internet being the case. The physical address probability can be the likelihood of an identifier of the place where someone lives or an organization is situated being the case. The phone number probability can be the likelihood of a string of unique digits that can be dialed to reach the user of a communication device being the case.

As described above in the jsmith@xyz.com example, the email address probability may be based on an email prefix dataset frequency of an email prefix value stored by an email prefix field in the personal record and/or an email domain dataset frequency of an email domain value stored by an email domain field in the personal record. The email prefix dataset frequency and the last name dataset frequency may be dependent frequencies. For example, the frequency of smith occurring in the email prefix jsmith depends on the frequency of smith occurring in a test dataset of last names.

An email prefix dataset frequency can be the rate at which a communication account user name occurs in a sample of a group of information. An email prefix value can be any symbols for a communication account user name. An email prefix field can be a part of a record that represents data for a communication account user name. An email domain dataset frequency can be the rate at which a web address for a communication account occurs in a sample of a group of information. An email domain value can be any symbols for a web address for a communication account. An email domain field can be a part of a record that represents data for a web address for a communication account.

The physical address probability may be based on a street dataset frequency of a street value stored by a street field in the personal record, a city dataset frequency of a city value stored by a city field in the personal record, a postal code dataset frequency of a postal code value stored by a postal code field in the personal record, a state dataset frequency of a state value stored by a state field in the personal record, and/or a country dataset frequency of a country value stored by a country field in the personal record. For example, the probability model determines that the personal record stores 1 Market Street, San Francisco, Calif., 94105, USA in its physical address fields, and assesses the uniqueness of the personal record through multiplying the probability that the personal record's country field stores USA by the probability that the personal record's state field stores California given that the personal record's country field stores USA, and the probability that the personal record's city field stores San Francisco given that the personal record's country field stores USA and the personal record's state field stores California. The probability model continues by multiplying these country-state-city probabilities by the probability that the personal record's postal code field stores 94105 given that the personal record's city field stores San Francisco, and the probability that the personal record's street field stores Market to produce the physical address probability for 1 Market Street, San Francisco, Calif., 94105, USA. A street dataset frequency can be the rate at which a road name occurs in a sample of a group of information. A street value can be any symbols for a road name. A street field can be a part of a record that represents data for a road name.

A city dataset frequency can be the rate at which a town name occurs in a sample of a group of information. A city value can be any symbols for a town name. A city field can be a part of a record that represents data for a town name. A postal code dataset frequency can be the rate at which a group of numbers and/or letters which are added to an address to assist the sorting of mail occurs in a sample of a group of information. A postal code value can be any symbols for a group of numbers and/or letters which are added to an address to assist the sorting of mail. A postal code field can be a part of a record that represents data for a group of numbers and/or letters which are added to an address to assist the sorting of mail.

A state dataset frequency can be the rate at which a name of an organized political community under one government occurs in a sample of a group of information. A state value can be any symbols for a name of an organized political community under one government. A state field can be a part of a record that represents data for a name of an organized political community under one government. A country dataset frequency can be the rate at which a nation name occurs in a sample of a group of information. A country value can be any symbols for a nation name. A country field can be a part of a record that represents data for a nation name.

The phone number probability may be based on an international code dataset frequency of an international code value stored by an international code field in the personal record, a region code dataset frequency of a region code value stored by a region code field in the personal record, a middle digits dataset frequency of a middle digits value stored by a middle digits field in the personal record, and/or a trailing digits dataset frequency of a trailing digits value stored by a trailing digits field in the personal record value. For example, the probability model determines that the personal record stores+01-415-901-1234 in the phone number fields, uses the international code field stores+01 to infer that the country is USA, and assesses the uniqueness of the personal record through multiplying the probability that the personal record's region code field stores 415 given that the personal record's country field stores USA, the probability that the personal record's middle digits field stores 901 given that the personal record's country field stores USA, and the probability that the personal record's trailing digits field stores 1234 given that the personal record's country field stores USA, thereby producing the phone number probability for +01-415-901-1234. An international code dataset frequency can be the rate at which country phone numbers occur or are repeated in a sample of a group of information. An international code value can be any symbol(s) for country phone numbers. An international code field can be a part of a record that represents data for country phone numbers.

A region code dataset frequency can be the rate at hich area phone numbers occur or are repeated in a sample of a group of information. A region code value can be any symbols for area phone numbers. A region code field can be a part of a record that represents data for area phone numbers. A middle digits dataset frequency can be the rate at which central phone numbers occur or are repeated in a sample of a group of information. A middle digits value can be any symbols for central phone numbers. A middle digits field can be a part of a record that represents data for central phone numbers.

A trailing digits dataset frequency can be the rate at which phone number endings occur in a sample of a group of information. A trailing digits value can be any symbols for phone number endings. A trailing digits field can be a part of a record that represents data for phone number endings. The country dataset frequency and the international code dataset frequency may be dependent frequencies. For example, the frequency of USA occurring in the personal record's country field and the frequency of +01 occurring in the personal record's international code field depend upon each other because+01 is the international code for the country USA.

After determining the individual probabilities, a combined probability is determined based on the name probability and the at least one other probability, block 306. The system calculates a uniqueness score for a personal record. In embodiments, this can include the probability model multiplying the name probability for John Smith by the email address probability for jsmith@xyz.com to produce the combined probability of less than 1 in a million for the personal record that stores John Smith, jsmith@xyz.com. A combined probability can be the likelihood of multiple things being the case.

In another example, the probability model assesses the personal record that stores John Smith 1 Market Street, San Francisco, Calif., 94105, USA by multiplying the name probability for John Smith by the physical address probability for 1 Market Street, San Francisco, Calif., 94105, USA to produce the combined probability of less than 1 in a million. In yet another example, the probability model assesses the personal record that stores John Smith+01-415-901-1234 by multiplying the name probability for John Smith by the phone number probability for +01-415-901-1234 to produce the combined probability of less than 1 in a million. In an additional example, the probability model assesses the personal record that stores John Smith, jsmith@xyz.com, 1 Market Street, San Francisco, Calif., 94105, USA by multiplying the joint probability for John Smith and jsmith@xyz.com by the physical address probability for 1 Market Street, San Francisco, Calif., 94105, USA to produce the combined probability of less than 1 in a million. In a further example, the probability model assesses the personal record that stores John Smith, jsmith@xyz.com, +01-415-901-1234 by multiplying the joint probability for John Smith and jsmith@xyz.com by the phone number probability for +01-415-901-1234 to produce the combined probability of less than 1 in a million. In one more example, the probability model assesses the personal record that stores John Smith, jsmith@xyz.com, 1 Market Street, San Francisco, Calif., 94105, USA, +01-415-901-1234 by multiplying the joint probability for John Smith and jsmith@xyz.com by the joint probability for 1 Market Street, San Francisco, Calif., 94105, USA and +01-415-901-1234 to produce the combined probability of less than 1 in a million.

Following the determination of the combined probability, a count of identifiable personal records is incremented for each personal record that has a corresponding combined probability that satisfies an identifiability threshold, block 308. The system counts the number of personal records that are identifiable. For example, and without limitation, this can include the probability model counting each personal record that has a combined probability of less than one in a million, including the personal record that stores John Smith, jsmith@xyz.com, as an identifiable personal record. A count can be an arithmetical value, expressed by a word, symbol, or figure, representing a particular quantity and used in making calculations. An identifiable personal record can be the storage in a persistent form of at least one value that is associated with a likelihood to uniquely determine one human. An identifiability threshold can be the magnitude that must be satisfied by a number, which expresses the likelihood to uniquely determine one human, for a specific result to occur.

Having counted the identifiable personal records, a message is output based on the count of identifiable personal messages, block 310. The system informs users about the number of identifiable personal messages. For example, the probability model outputs a message that the 500,000 identifiable personal records are likely to create 250,000 accurate personal profiles, which is a sufficient number of accurate personal profiles for managing the personal records.

When determining the content of the output message, a determination is optionally made whether the count of identifiable personal records relative to the count of all personal records satisfies a personal profiles creation threshold, block 310. The system determines whether enough personal records are identifiable to recommend immediately creating personal profiles. By way of example and without limitation, this can include the probability model determining whether 50 percentage of all personal records are identifiable personal records. If enough of all personal records are identifiable personal records, the method 300 terminates. If not enough of all personal records are identifiable personal records, the method 300 proceeds to block 314 to recommend a delay in creating personal profiles based on the identifiable personal records. A personal profiles creation threshold can be the magnitude that must be satisfied by a number to generate representations of information relating to particular characteristics of people. A personal profile can be a representation of information relating to particular characteristics of a human.

If the count of identifiable personal records relative to the count of all personal records does not satisfy the personal profiles creation threshold, creation of personal profiles is optionally recommended to be delayed based on the identifiable personal records, block 314. The system recommends not creating personal profiles until sufficient numbers of personal records are identifiable. For example, and without limitation, this can include the probability model recommending the postponement of using the identifiable personal records to create a sufficient number of accurate personal profiles for managing the personal records because the count of identifiable personal records is less than five percent of all personal records. If such a postponement is recommended, the probability model may be able to suggest ways to increase the number of identifiable personal records, such as requiring more fields to be filled in during registration on their web site or purchasing data from data.com to compensate for the missing fields in personal records.

The method 300 may be repeated as desired. Although this disclosure describes the blocks 302-314 executing in a particular order, the blocks 302-314 may be executed in a different order. In other implementations, each of the blocks 302-314 may also be executed in combination with other blocks and/or some blocks may be divided into a different set of blocks.

System Overview

Figure 4:
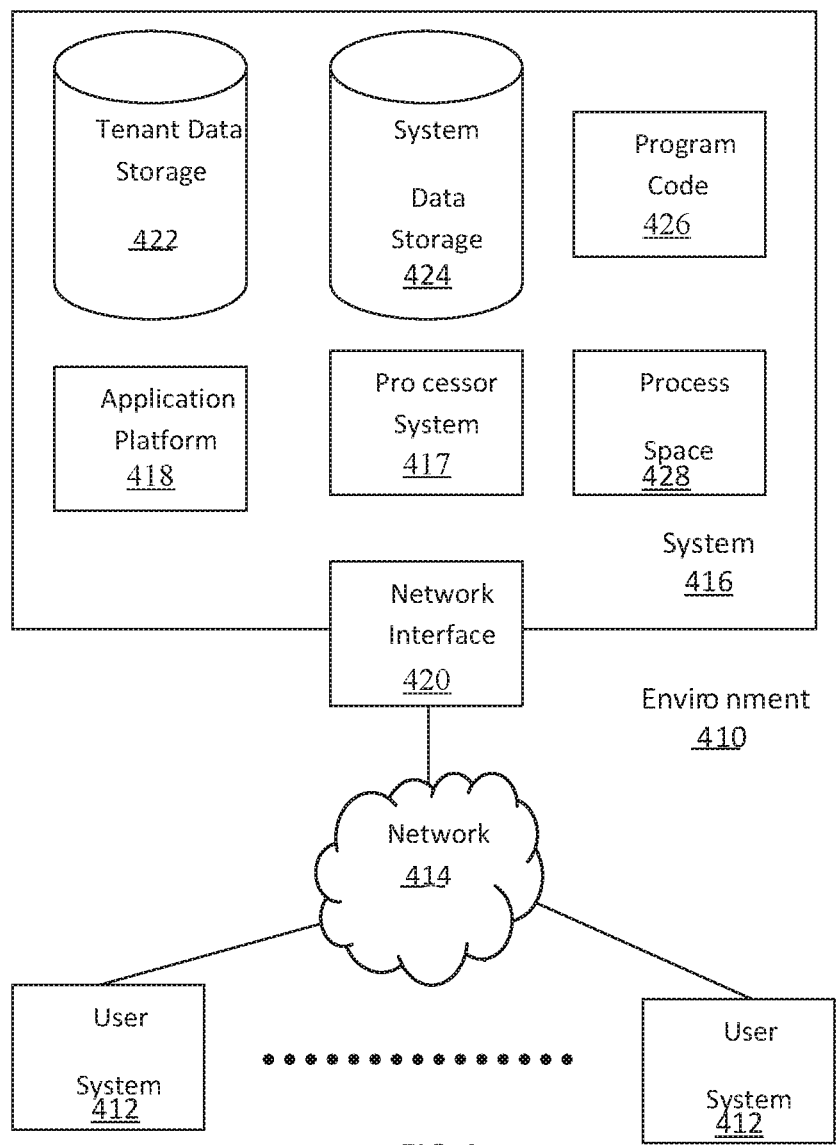
FIG. 4 illustrates a block diagram of an example of an environment wherein an on-demand database service might be used.

FIG. 4 illustrates a block diagram of an environment 410 wherein an on-demand database service might be used. The environment 410 may include user systems 412, a network 414, a system 416, a processor system 417, an application platform 418, a network interface 420, a tenant data storage 422, a system data storage 424, program code 426, and a process space 428. In other embodiments, the environment 410 may not have all of the components listed and/or may have other elements instead of, or in addition to, those listed above.

The environment 410 is an environment in which an on-demand database service exists. A user system 412 may be any machine or system that is used by a user to access a database user system. For example, any of the user systems 412 may be a handheld computing device, a mobile phone, a laptop computer, a work station, and/or a network of computing devices. As illustrated in FIG. 4 (and in more detail in FIG. 5) the user systems 412 might interact via the network 414 with an on-demand database service, which is the system 416.

An on-demand database service, such as the system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 416" and the "system 416" will be used interchangeably herein. A database image may include one or more database objects. A relational database management system (RDMS) or the equivalent may execute storage and retrieval of information against the database object(s). The application platform 418 may be a framework that allows the applications of the system 416 to run, such as the hardware and/or software, e.g., the operating system. In an embodiment, the on-demand database service 416 may include the application platform 418 which enables creation, managing and executing one or more applications developed by the provider of the on-demand database service, users accessing the on-demand database service via user systems 412, or third-party application developers accessing the on-demand database service via the user systems 412.

The users of the user systems 412 may differ in their respective capacities, and the capacity of a particular user system 412 might be entirely determined by permissions (permission levels) for the current user. For example, where a salesperson is using a particular user system 412 to interact with the system 416, that user system 412 has the capacities allotted to that salesperson. However, while an administrator is using that user system 412 to interact with the system 416, that user system 412 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 414 is any network or combination of networks of devices that communicate with one another. For example, the network 414 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 412 might communicate with the system 416 using TCP/IP and, at a higher network level, use other common Internet protocols to communicate, such as HTTP, FTP, AFS, WAP, etc. In an example where HTTP is used, the user systems 412 might include an HTTP client commonly referred to as a "browser" for sending and receiving HTTP messages to and from an HTTP server at the system 416. Such an HTTP server might be implemented as the sole network interface between the system 416 and the network 414, but other techniques might be used as well or instead. In some implementations, the interface between the system 416 and the network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 416, shown in FIG. 4, implements a web-based customer relationship management (CRM) system. For example, in one embodiment, the system 416 includes application servers configured to implement and execute CRM software applications as well as provide related data, code, forms, webpages and other information to and from the user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 416 implements applications other than, or in addition to, a CRM application. For example, the system 416 may provide tenant access to multiple hosted (standard and custom) applications, including a CRM application. User (or third-party developer) applications, which may or may not include CRM, may be supported by the application platform 418, which manages creation, storage of the applications into one or more database objects and executing of the applications in a virtual machine in the process space of the system 416.

One arrangement for elements of the system 416 is shown in FIG. 4, including the network interface 420, the application platform 418, the tenant data storage 422 for tenant data 423, the system data storage 424 for system data 425 accessible to the system 416 and possibly multiple tenants, the program code 426 for implementing various functions of the system 416, and the process space 428 for executing MTS system processes and tenant-specific processes, such as running applications as part of an application hosting service. Additional processes that may execute on the system 416 include database indexing processes.

Several elements in the system shown in FIG. 4 include conventional, well-known elements that are explained only briefly here. For example, each of the user systems 412 could include a desktop personal computer, workstation, laptop, PDA, cell phone, or any wireless access protocol (WAP) enabled device or any other computing device capable of interfacing directly or indirectly to the Internet or other network connection. Each of the user systems 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 412 to access, process and view information, pages and applications available to it from the system 416 over the network 414. Each of the user systems 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 416 or other systems or servers. For example, the user interface device may be used to access data and applications hosted by the system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 412 and all of its components are operator configurable using applications, such as a browser, including computer code run using a central processing unit such as an Intel Pentium® processor or the like. Similarly, the system 416 (and additional instances of an MTS, where more than one is present) and all of their components might be operator configurable using application(s) including computer code to run using a central processing unit such as the processor system 417, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 416 is configured to provide webpages, forms, applications, data and media content to the user (client) systems 412 to support the access by the user systems 412 as tenants of the system 416. As such, the system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 5:
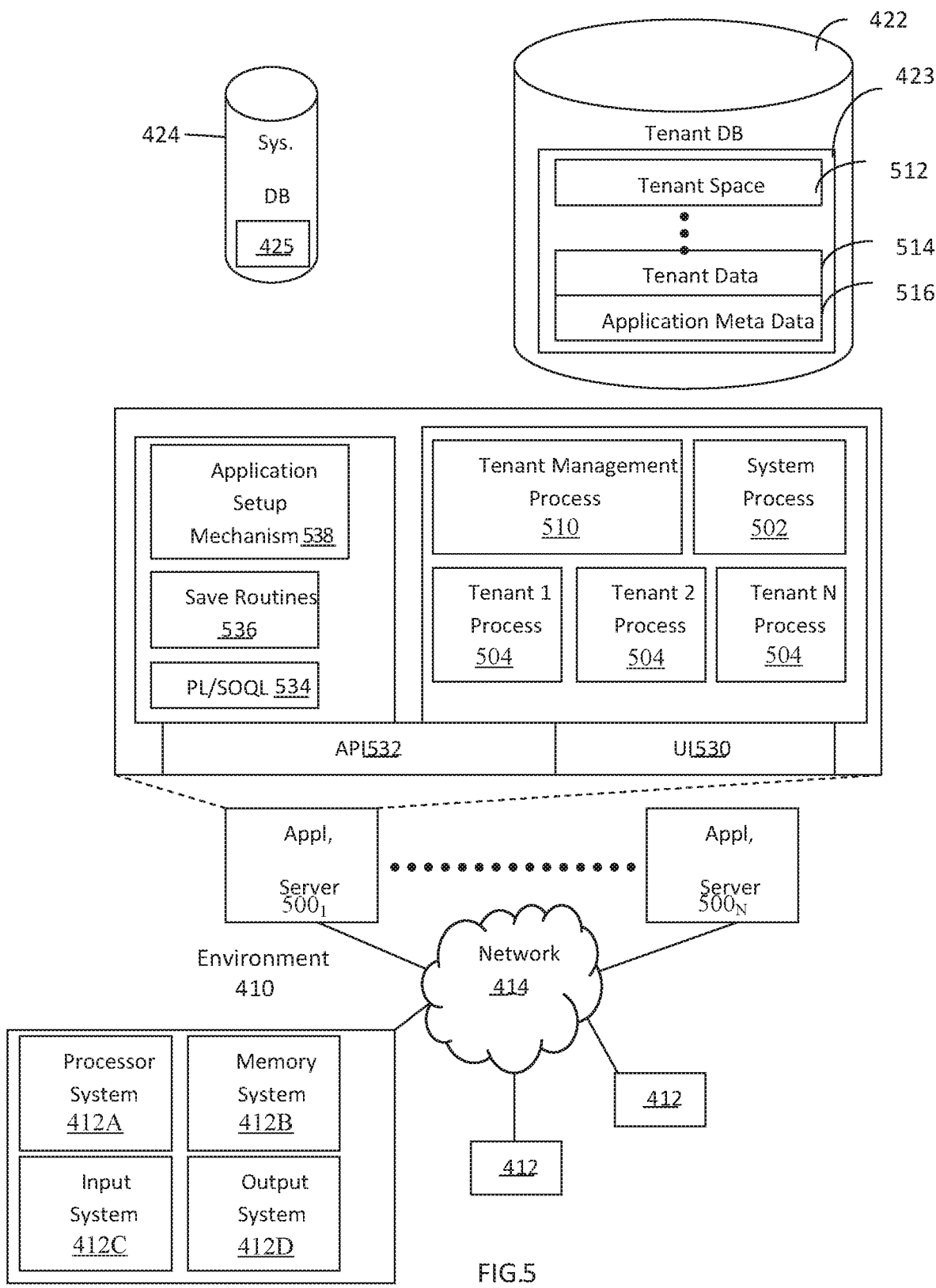
FIG. 5 illustrates a block diagram of an embodiment of elements of FIG. 4 and various possible interconnections between these elements.

FIG. 5 also illustrates the environment 410. However, in FIG. 5 elements of the system 416 and various interconnections in an embodiment are further illustrated. FIG. 5 shows that the each of the user systems 412 may include a processor system 412A, a memory system 412B, an input system 412C, and an output system 412D. FIG. 5 shows the network 414 and the system 416. FIG. 5 also shows that the system 416 may include the tenant data storage 422, the tenant data 423, the system data storage 424, the system data 425, a User Interface (UI) 530, an Application Program Interface (API) 532, a PL/SOQL 534, save routines 536, an application setup mechanism 538, applications servers $500_1$-$500_N$, a system process space 502, tenant process spaces 504, a tenant management process space 510, a tenant storage area 512, a user storage 514, and application metadata 516. In other embodiments, the environment 410 may not have the same elements as those listed above and/or may have other elements instead of, or in addition to, those listed above.

The user systems 412, the network 414, the system 416, the tenant data storage 422, and the system data storage 424 were discussed above in FIG. 4. Regarding the user systems 412, the processor system 412A may be any combination of one or more processors. The memory system 412B may be any combination of one or more memory devices, short term, and/or long-term memory. The input system 412C may be any combination of input devices, such as one or more keyboards, mice, trackballs, scanners, cameras, and/or interfaces to networks. The output system 412D may be any combination of output devices, such as one or more monitors, printers, and/or interfaces to networks. As shown by FIG. 5, the system 416 may include the network interface 420 (of FIG. 4) implemented as a set of HTTP application servers 500, the application platform 418, the tenant data storage 422, and the system data storage 424. Also shown is the system process space 502, including individual tenant process spaces 504 and the tenant management process space 510. Each application server 500 may be configured to access tenant data storage 422 and the tenant data 423 therein, and the system data storage 424 and the system data 425 therein to serve requests of the user systems 412. The tenant data 423 might be divided into individual tenant storage areas 512, which may be either a physical arrangement and/or a logical arrangement of data. Within each tenant storage area 512, the user storage 514 and the application metadata 516 might be similarly allocated for each user. For example, a copy of a user's most recently used (MRU) items might be stored to the user storage 514. Similarly, a copy of MRU items for an entire organization that is a tenant might be stored to the tenant storage area 512. The UI 530 provides a user interface and the API 532 provides an application programmer interface to the system 416 resident processes to users and/or developers at the user systems 412. The tenant data and the system data may be stored in various databases, such as one or more Oracle™ databases.

The application platform 418 includes the application setup mechanism 538 that supports application developers' creation and management of applications, which may be saved as metadata into the tenant data storage 422 by the save routines 536 for execution by subscribers as one or more tenant process spaces 504 managed by the tenant management process 510 for example. Invocations to such applications may be coded using the PL/SOQL 534 that provides a programming language style interface extension to the API 532. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 516 for the subscriber making the invocation and executing the metadata as an application in a virtual machine.

Each application server 500 may be communicably coupled to database systems, e.g., having access to the system data 425 and the tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also may be used. For example, in certain embodiments, three consecutive requests from the same user could hit three different application servers 500, and three requests from different users could hit the same application server 500. In this manner, the system 416 is multi-tenant, wherein the system 416 handles storage of, and access to, different objects, data and applications across disparate users and organizations.

As an example of storage, one tenant might be a company that employs a sales force where each salesperson uses the system 416 to manage their sales process. Thus, a user might maintain contact data, leads data, customer follow-up data, performance data, goals and progress data, etc., all applicable to that user's personal sales process (e.g., in the tenant data storage 422). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 416 might also maintain system level data usable by multiple tenants or other data. Such system level data might include industry reports, news, postings, and the like that are sharable among tenants.

In certain embodiments, the user systems 412 (which may be client systems) communicate with the application servers 500 to request and update system-level and tenant-level data from the system 416 that may require sending one or more queries to the tenant data storage 422 and/or the system data storage 424. The system 416 (e.g., an application server 500 in the system 416) automatically generates one or more SQL statements (e.g., one or more SQL queries) that are designed to access the desired information. The system data storage 424 may generate query plans to access the requested data from the database.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for efficiently and accurately assessing the number of identifiable records for creating personal profiles, comprising:

one or more processors; and
a non-transitory computer readable medium storing a plurality of instructions, which when executed, cause the one or more processors to:
determine a first probability based on a dataset frequency of a first name value stored by a first field in a personal record and a dataset frequency of a last name value stored by a second field in the personal record;
determine a second probability based on a dataset frequency of a value stored by a third field in the personal record multiplied by a dataset frequency of a value stored by a fourth field in the personal record;
determine a combined probability based on the first probability multiplied by the second probability;
increment a count of identifiable personal records for each personal record that has a corresponding combined probability that satisfies an identifiability threshold; and
output a message based on the count of identifiable personal records.

2. The system of claim 1, wherein the dataset frequency of the first name value and the dataset frequency of the last name value are one of independent frequencies, dependent frequencies, and based on a combination of independent frequencies and dependent frequencies.

3. The system of claim 1, wherein the second probability comprises an email address probability based on at least one of an email prefix dataset frequency of an email prefix value stored by an email prefix field in the personal record and an email domain dataset frequency of an email domain value stored by an email domain field in the personal record, the email prefix dataset frequency and the dataset frequency of the last name value being dependent frequencies.

4. The system of claim 1, wherein the second probability comprises a physical address probability based on at least one of a street dataset frequency of a street value stored by a street field in the personal record, a city dataset frequency of a city value stored by a city field in the personal record, a postal code dataset frequency of a postal code value stored by a postal code field in the personal record, a state dataset frequency of a state value stored by a state field in the personal record, and a country dataset frequency of a country value stored by a country field in the personal record.

5. The system of claim 4, wherein the second probability comprises a phone number probability based on at least one of an international code dataset frequency of an international code value stored by an international code field in the personal record, a region code dataset frequency of a region code value stored by a region code field in the personal record, a middle digits dataset frequency of a middle digits value stored by a middle digits field in the personal record, and a trailing digits dataset frequency of a trailing digits value stored by a trailing digits field in the personal record value.

6. The system of claim 5, wherein the country dataset frequency and the international phone number dataset frequency are dependent frequencies.

7. The system of claim 1, wherein the plurality of instructions, when executed, will further cause the one or more processors to:
determine whether the count of identifiable personal records relative to a count of all personal records satisfies a personal profiles creation threshold; and
recommend a delay in creating personal profiles based on the identifiable personal records in response to a determination that the count of identifiable personal records relative to the count of all personal records fails to satisfy the personal profiles creation threshold.

8. A computer program product for efficiently and accurately assessing the number of identifiable records for creating personal profiles, comprising computer-readable program code to be executed by one or more processors when retrieved from a non-transitory computer-readable medium, the program code including instructions to:
determine a first probability based on a dataset frequency of a first name value stored by a first field in a personal record and a dataset frequency of a last name value stored by a second field in the personal record;
determine a second probability based on a dataset frequency of a value stored by a third field in the personal record multiplied by a dataset frequency of a value stored by a fourth field in the personal record;
determine a combined probability based on the first probability multiplied by the second probability;
increment a count of identifiable personal records for each personal record that has a corresponding combined probability that satisfies an identifiability threshold; and
output a message based on the count of identifiable personal.

9. The computer program product of claim 8, wherein the dataset frequency of the first name value and the dataset frequency of the last name value are one of independent frequencies, dependent frequencies, and based on a combination of independent frequencies and dependent frequencies.

10. The computer program product of claim 8, wherein the second probability comprises an email address probability based on at least one of an email prefix dataset frequency of an email prefix value stored by an email prefix field in the personal record and an email domain dataset frequency of an email domain value stored by an email domain field in the personal record, the email prefix dataset frequency and dataset frequency of the last name value being dependent frequencies.

11. The computer program product of claim 8, wherein the second probability comprises a physical address probability based on at least one of a street dataset frequency of a street value stored by a street field in the personal record, a city dataset frequency of a city value stored by a city field in the personal record, a postal code dataset frequency of a postal code value stored by a postal code field in the personal record, a state dataset frequency of a state value stored by a state field in the personal record, and a country dataset frequency of a country value stored by a country field in the personal record.

12. The computer program product of claim 11, wherein the second probability comprises a phone number probability based on at least one of an international code dataset frequency of an international code value stored by an international code field in the personal record, a region code dataset frequency of a region code value stored by a region code field in the personal record, a middle digits dataset frequency of a middle digits value stored by a middle digits field in the personal record, and a trailing digits dataset frequency of a trailing digits value stored by a trailing digits field in the personal record value.

13. The computer program product of claim 12, wherein the country dataset frequency and the international phone number dataset frequency are dependent frequencies.

14. The computer program product of claim 8, wherein the program code further includes instructions to:
determine whether the count of identifiable personal records relative to a count of all personal records satisfies a personal profiles creation threshold; and
recommend a delay in creating personal profiles based on the identifiable personal records in response to a determination that the count of identifiable personal records relative to the count of all personal records fails to satisfy the personal profiles creation threshold.

15. A method for efficiently and accurately assessing the number of identifiable records for creating personal profiles, comprising:
determining a first probability based on a dataset frequency of a first name value stored by a first field in a personal record and a dataset frequency of a last name value stored by a second field in the personal record;
determining a second probability based on a dataset frequency of a value stored by a third field in the personal record multiplied by a dataset frequency of a value stored by a fourth field in the personal record;
determining a combined probability based on the first probability multiplied by the second probability;
incrementing a count of identifiable personal records for each personal record that has a corresponding combined probability that satisfies an identifiability threshold; and
output a message based on the count of identifiable personal records.

16. The method of claim 15, wherein the dataset frequency of the first name value and the dataset frequency of the last name value are one of independent frequencies, dependent frequencies, and based on a combination of independent frequencies and dependent frequencies.

17. The method of claim 15, wherein the second probability comprises an email address probability based on at least one of an email prefix dataset frequency of an email prefix value stored by an email prefix field in the personal record and an email domain dataset frequency of an email domain value stored by an email domain field in the personal record, the email prefix dataset frequency and dataset frequency of the last name value being dependent frequencies.

18. The method of claim 15, wherein the second probability comprises a physical address probability based on at least one of a street dataset frequency of a street value stored by a street field in the personal record, a city dataset frequency of a city value stored by a city field in the personal record, a postal code dataset frequency of a postal code value stored by a postal code field in the personal record, a state dataset frequency of a state value stored by a state field in the personal record, and a country dataset frequency of a country value stored by a country field in the personal record.

19. The method of claim 18, wherein the second probability comprises a phone number probability based on at least one of an international code dataset frequency of an international code value stored by an international code field in the personal record, a region code dataset frequency of a region code value stored by a region code field in the personal record, a middle digits dataset frequency of a middle digits value stored by a middle digits field in the personal record, and a trailing digits dataset frequency of a trailing digits value stored by a trailing digits field in the personal record value, the country dataset frequency and the international phone number dataset frequency being dependent frequencies.

20. The method of claim 15, wherein the method further comprises:
determine whether the count of identifiable personal records relative to a count of all personal records satisfies a personal profiles creation threshold; and recommending not to create personal profiles based on the identifiable personal records in response to a determination that the count of identifiable personal records relative to the count of all personal records fails to satisfy the personal profiles creation threshold.

* * * * *